Aug. 4, 1964    H. C. RHODES    3,143,084
ADJUSTABLE FLEXIBLE DOUGH MOLDING ASSEMBLY
Filed Sept. 12, 1962    2 Sheets-Sheet 1
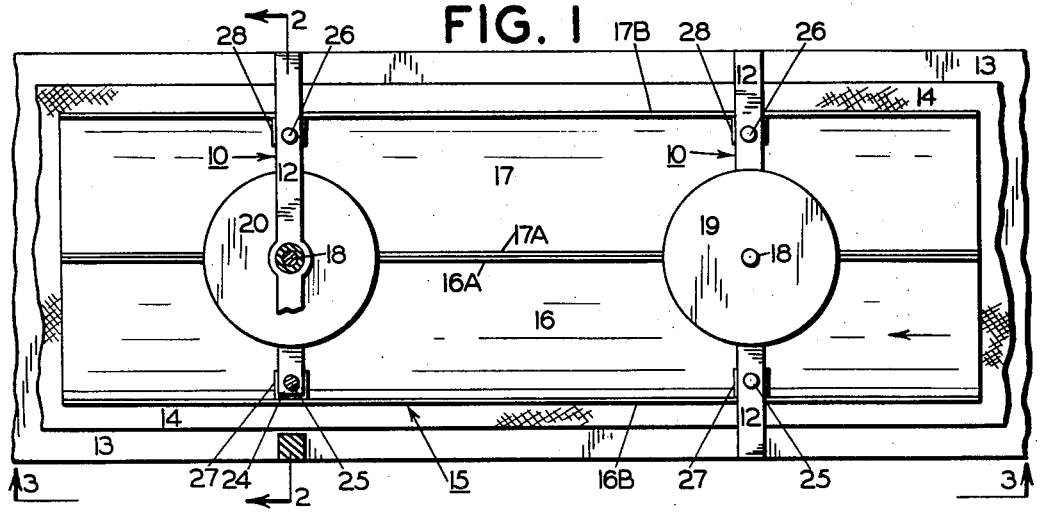
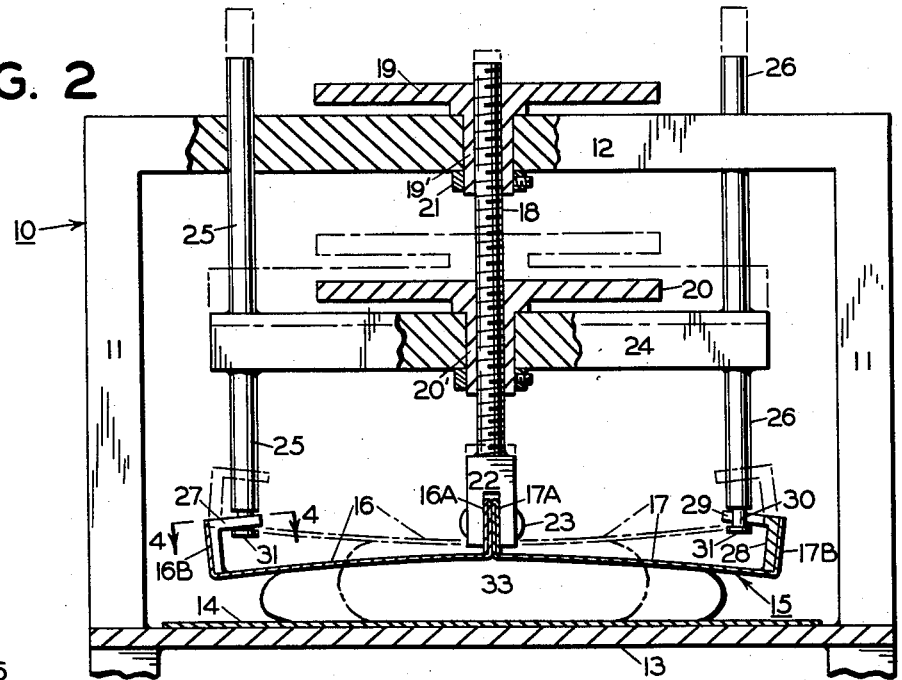
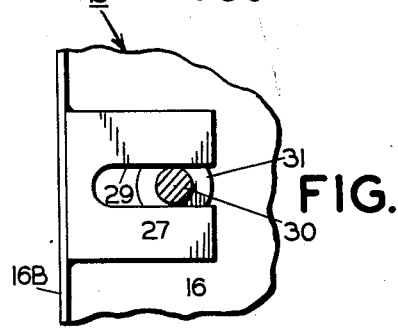
*INVENTOR.*
HERBERT C. RHODES
BY *T. R. Geisler*
ATTORNEY

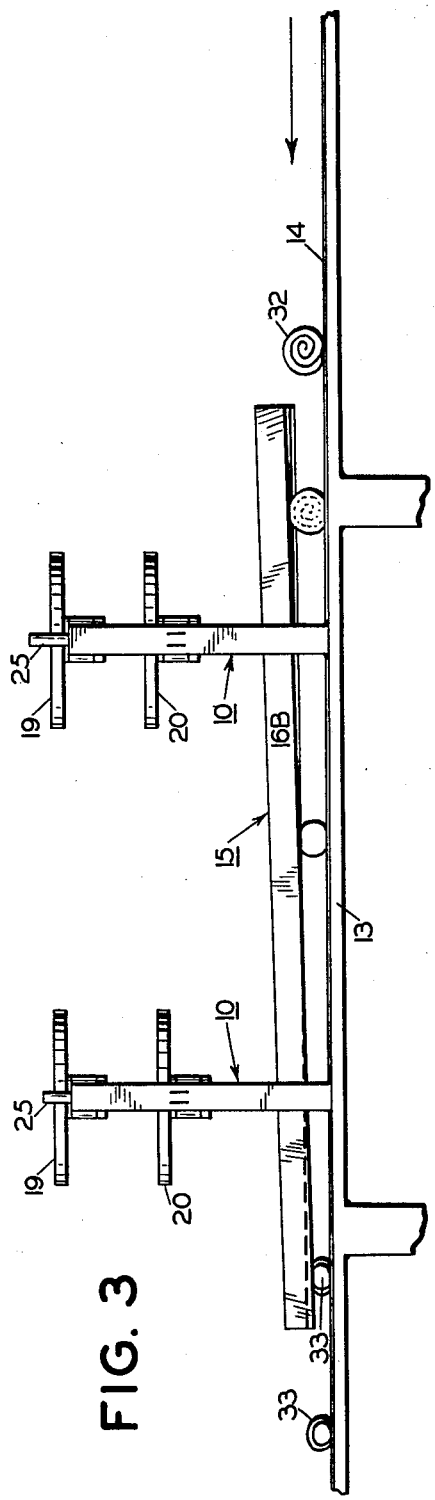

United States Patent Office 3,143,084
Patented Aug. 4, 1964

3,143,084
ADJUSTABLE FLEXIBLE DOUGH MOLDING ASSEMBLY
Herbert C. Rhodes, 10106 SE. Stark St., Portland, Oreg.
Filed Sept. 12, 1962, Ser. No. 223,167
4 Claims. (Cl. 107—9)

This invention relates in general to the molding of pieces of dough in the manufacture of bakery products, and, more specifically, relates to the final molding or shaping of the individual pieces of dough prior to the deposit of these in baking pans.

While it has been possible in many instances to have the final molding or shaping of the dough pieces for bread loaves and the like performed mechanically, nevertheless, when bread loaves, rolls and buns of certain shapes are required, it has heretofore been considered necessary to perform the final shaping manually. This has been the case particularly with elongated bread loaves and rolls which taper in size towards both ends, such as certain forms of "French Bread," large size "Wiener" rolls, and the like.

The object of the present invention accordingly is to provide improved means, in the form of a novel dough molding board assembly, by which the final shaping or molding of such specially shaped bread loaves and rolls can be accomplished as desired without the necessity of manually shaping the dough pieces.

Another object of the invention is to provide a novel dough molding board assembly which can be readily adjusted for the molding of different shapes and sizes of dough pieces as well as for different types of dough.

These objects are obtained with the adjustable flexible molding board assembly constructed and employed as hereinafter briefly described with reference to the accompanying drawings.

In the drawings:

FIG. 1 is a top plan view of the molding board assembly, with a portion broken away;

FIG. 2 is a sectional elevation taken on line 2—2 of FIG. 1 drawn to a larger scale;

FIG. 3 is a side elevation taken on line 3—3 of FIGURE 1;

FIG. 4 is a fragmentary section on line 4—4 of FIGURE 2 drawn to a larger scale; and FIGS. 5A and 5B are a plan view and a side view respectively of a piece of dough which has received final shaping by the molding board assembly for producing a loaf of bread in the special shape customary for "French Bread."

Referring to FIGS. 1, 2 and 3, the device includes a pair of identical open frames 10, each having a pair of vertical side members 11, extending upwardly from opposite sides of a table or platform base 13, to which they are rigidly secured, with the top ends of the side members in each frame joined by an integral horizontal, transversely-extending member 12. The two frames 10, 10 thus extend in parallel vertical planes perpendicular to the longitudinal center line of the platform base 13.

An endless traveling belt 14, of canvas or other suitable material, conveying the individual dough pieces for final molding by the assembly, moves along on the base 13 (for example, from right to left as viewed in FIGS. 1 and 3 and as indicated by the arrows), passing along inside of the vertical side members 11 of each of the frames 10.

A flexible dough-containing plate, designated in its entirety by the reference character 15, formed of thin flexible sheet steel or other suitable flexible sheet material, is adjustably mounted spaced above the platform base 13 and the conveyor belt 14. Preferably this flexible plate 15 is formed from a pair of identical sheets 16 and 17 each constituting one-half of the composite plate 15 as shown best in FIG. 2. The inside longitudinal edge portion of each sheet is turned upwardly at 90° and then folded over on itself, forming an edge rib 16A and 17A respectively of double thickness extending the entire length of the sheets. These inner edge ribs of the two sheets are secured together and held in supporting suspension means presently described. The outside edge portions of the two sheets 16 and 17 are also turned upwardly 90° to form an outer wall or rib 16B and 17B respectively, similarly extending the entire length of the sheets.

A vertical suspension shaft 18 extends downwardly through the middle of the horizontal top member 12 of each of the open frames 10. Each shaft 18 is threaded and passes through and is engaged by a threaded hub channel in an upper adjusting wheel 19 and also extends through a threaded hub channel in a similar lower adjusting wheel 20. The upper adjusting wheel 19 has a downwardly extending hub portion 19' of reduced diameter (FIG. 2) which is rotatably mounted in a corresponding channel provided in the horizontal top member 12, and a holding ring 21, secured on the bottom end of the hub extension 19' beneath the top member 12, combines with the upper large portion of the wheel hub to prevent any movement of the wheel 20 in an axial direction with respect to the stationary member 12 while allowing the wheel 20 to rotate in the member 12.

The bottom end of the shaft 18 is formed into an enlarged bifurcated foot 22 (FIG. 2) having a recess of the proper size to receive the inner edge ribs 16A and 17A of the flexible sheets 16 and 17, and a suitable rivet or bolt 23 holds these ribs firmly secured in the foot 22 of each suspension shaft 18. Thus, as apparent from FIGS. 2 and 3, rotation of each of the adjusting wheels 19 in either direction will cause the longitudinally-extending composite center rib of the composite plate 15 to be raised or lowered in the area of the corresponding frame 10.

Each of the two lower adjusting wheels 20 in the two frames 10 has a downwardly extending hub portion 20' (FIG. 2) of reduced diameter which similarly is rotatably mounted in a horizontal cross bar 24. A pair of identical vertical rods 25 and 26 extend through the ends of each cross bar 24 respectively and are rigidly secured to the corresponding cross bar. The upper ends of these rods 25 and 26 slide in vertical channels provided in the stationary horizontal top member 12 of the respective frame 10.

A pair of angle brackets 27 and 28 (FIG. 2) are secured to the outer edge ribs 16B and 17B respectively of the flexible plate 15 below each of the cross bars 24. Each of the brackets 27 and 28 has an inwardly extending top flange which is bifurcated or provided with a center slot 29 (FIG. 4). The bottom end of each of the vertical rods 25 and 26 is reduced in diameter, as indicated at 30 in FIGS. 2 and 4, so as to enable the bottom portion to pass through the slot 29 of the corresponding bracket 27 or 28, and a collar 31, secured on the end of each bottom portion 30 of each of the rods 25 and 26 below the top flange of the corresponding bracket 27 or 28, causes the brackets 27 and 28, and therewith the outer edge ribs of the flexible plate 15, to be permanently but loosely secured to the supporting rods 25 and 26.

Each of the cross bars 24 (FIG. 2), and consequently the pair of vertical rods 25 and 26 rigidly secured to the cross bar 24, is thus carried by the lower adjusting wheel 20 which in turn is adjustably carried on the corresponding suspension shaft 18. From FIGS. 2 and 3 it will now be apparent that rotation of each upper adjusting wheel 19, in one direction or the other, producing the raising or lowering of the corresponding suspension shaft 18, will raise or lower the composite center longitudinal rib 16A–17A, of the flexible plate 15 in the area about the bottom of the shaft 18, and such raising or lowering of the shaft 18, without adjustment or rotation of the lower wheel 20 on the shaft, will cause the corresponding cross bar 24 and the connected pair of vertical rods 25 and 26, and therewith the side ribs 16B and 17B of the flexible plate 15 in the same area to be raised or lowered in unison with the composite center rib. On the other hand, the rotation or adjustment of the lower wheel 20 on the suspension shaft 18 will result in the side ribs 16B and 17B being raised or lowered with respect to the composite center rib 16A–17A in that area.

In other words, not only can the spacing of the flexible plate 15 above the conveyor belt 14 and table 13 be adjusted at each of the frames 10 but the transverse curvature of the bottom face of the flexible plate 15 can also be adjusted at each of the frames 10. Thus, FIG. 2 illustrates how the transverse curvature of the bottom face of the flexible plate 15 can be changed from a convex curvature, such as indicated by the broken lines, to a concave curvature illustrated by the full lines, as a result of the lowering of the lower wheel 20, cross bar 24 and vertical rods 25 and 26 from the broken to full line positions with respect to the center suspension shaft 18; and also illustrates how the height of the side and center portions, and consequently the height of the entire flexible plate 15 above the belt 14 in the area about the shaft 18 can be adjusted by manipulation of the upper wheel 19 alone.

FIG. 3 illustrates how the flexible molding assembly can be adjusted to accomplish the final shaping of a particular piece of dough 32 of a standard substantially cylindrical shape into a specially shaped piece of dough 33 considerably elongated and tapering toward each end, which final shape of such piece of dough is also illustrated in FIGS. 5A and 5B, which show a plan view and a side elevation respectively of the shaped dough 33. In attaining this result the molding assembly is so adjusted that the right hand or receiving end of the flexible plate 15 (as viewed in FIG. 3) will present a convex surface to the approaching dough piece 32. Thus, the center longitudinal composite rib of the flexible plate 15 is positioned lower than the side ribs at this end. As the dough piece 32 is caused to pass along beneath the flexible plate 15 the first effect will be to cause the dough to be pushed outwardly in opposite directions. It will be noted that the spacing of the flexible plate 15 above the traveling belt 14 decreases towards the left so as to continue to cause the dough piece to be extended and reduced in diameter, but that the side ribs of the flexible plate 15 finally become lower than the composite center rib, thus causing the bottom face, or dough-engaging face of the flexible plate 15, gradually to change to a concave curvature and thus produce the desired tapering of both ends of the dough piece. In this way the elongation and special final shaping of the dough piece is accomplished gradually and firmly but without any danger of breaking or separating the dough and without any manual shaping or handling of the dough being required.

The composite longitudinal center rib and the side ribs which extend the entire length of the flexible plate 15 are important and necessary for giving the plate sufficient longitudinal rigidity to enable pressure on the dough to be maintained during its entire contact with the flexible plate 15 but at the same time these longitudinal ribs enable the plate 15 to be flexible transversely throughout its extension. This is necessary for the proper carrying out of the purpose of the invention.

Various minor modifications would be possible in the construction of the assembly without departing from the principle of the invention and without sacrifice of the important features of transverse flexibilty, longitudinal rigidity, and simplicity of adjusting means. Thus it would be possible to have the flexible plate 15 made from a single sheet of material with a longitudinal center rib formed by a fold in the sheet, or even to have a separate rigid reinforcing bar secured to the top face of a sheet and extending along the horizontal center line to form the longitudinal center reinforcement or rib. However, the device, when constructed as herein illustrated and described, has been found to be very satisfactory in practice and accordingly this particular construction is regarded as the preferred means for the carrying out of the invention.

I claim:

1. In a dough molding assembly of the character described including a conveyor for the dough pieces to be molded, a flexible plate adjustably mounted above the conveyor for engagement with the dough pieces moved along on said conveyor, a central longitudinal reinforcing rib on the top face of said plate, longitudinal side reinforcing ribs along the side edges of said plate, said plate being transversely flexible, adjustable means for supporting said side ribs at a pair of locations along said flexible plate so arranged that the spacing of said ribs, and therewith the spacing of said side edges of said plate above said conveyor can be adjusted at each of said locations, and adjustable means for supporting said central rib at said locations so arranged that the spacing of said central rib, and therewith the spacing of the center portion of said plate above said conveyor, can be separately adjusted at each of said stations, whereby the transverse curvature of the bottom dough-engaging face of said plate as well as the spacing of said face above said conveyor can be adjusted independently at each of said stations.

2. In a dough molding assembly, a conveyor for the dough pieces to be molded, a flexible plate suspended above said conveyor for engagement with the dough pieces moved along said conveyor, central longitudinally-extending reinforcing means on the top face of said plate, longitudinally-extending side reinforcing means along the side edges of said plate, said central and said side reinforcing means extending substantially in the entire length of said plate, said plate being transversely flexible, a pair of supporting frames for said flexible plate extending above said conveyor spaced from each other, adjustable mounting means in each of said frames for said side reinforcing means, and separately adjustable mounting means in each of said frames for said central longitudinal reinforcing means, whereby the transverse curvature of the bottom dough-engaging face of said plate as well as the spacing of said face above said conveyor can be adjusted independently at each of said supporting frames.

3. A dough molding assembly including a conveyor for the dough pieces to be molded, a flexible plate adjustably suspended above said conveyor for engagement with the dough pieces moved along on said conveyor, a central longitudinal reinforcing rib on the top face of said plate, longitudinal side reinforcing ribs along the side edges of said plate, said central and said side ribs extending substantially the entire length of said plate, said plate being transversely flexible, a pair of supporting frames for said flexible plate extending over said conveyor and spaced from each other, adjustable suspension means in each of said frames for said central longitudinal reinforcing rib, and connected but independently adjustable means on said adjustable suspension means for supporting said side reinforcing ribs, whereby the transverse curvature of the bottom dough-engaging face of said plate as well as the spacing of said face above said conveyor can be adjusted independently at each of said supporting frames.

4. In a dough molding assembly of the character described, including a conveyor for the dough pieces to be molded, a flexible plate adjustably suspended above the conveyor for engagement with the dough pieces moved along on said conveyor, central longitudinal reinforcing means on the top face of said plate, longitudinal side reinforcing means on the side edges of said plate, said central and said side reinforcing means extending substantially the entire length of said plate, said plate being transversely flexible, a pair of supporting frames for said flexible plate extending over said conveyor and spaced from each other, a vertical shaft adjustably mounted in each of said frames, the bottom end of each shaft connected with said plate along said central longitudinal reinforcing means, a cross bar adjustably supported on each of said shafts, and means attached to the ends of each cross bar for supporting said longitudinal side reinforcing means of said plate respectively, whereby the side edges and the center portion of said plate will be independently adjustably supported at each of said frames, thereby enabling the transverse curvature of the bottom dough-engaging face of said plate and the spacing of said plate above said conveyor to be adjusted at each of said frames.

References Cited in the file of this patent
UNITED STATES PATENTS

| | | |
|---|---|---|
| 818,518 | Clemons | Apr. 24, 1906 |
| 959,614 | Schimmel | May 31, 1910 |
| 1,870,256 | Lauterbur | Aug. 9, 1932 |